(12) United States Patent
Liu et al.

(10) Patent No.: US 7,016,131 B2
(45) Date of Patent: Mar. 21, 2006

(54) METHOD AND IMPLEMENTATION OF IN-SITU ABSOLUTE HEAD MEDIUM SPACING MEASUREMENT

(75) Inventors: Bo Liu, Singapore (SG); Zhimin Yuan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 78 days.

(21) Appl. No.: 10/651,636

(22) Filed: Aug. 29, 2003

(65) Prior Publication Data

US 2005/0046982 A1    Mar. 3, 2005

(51) Int. Cl.
  *G11B 27/36*   (2006.01)
  *G11B 21/02*   (2006.01)
(52) U.S. Cl. .................................. 360/31; 360/75
(58) Field of Classification Search ................ 360/31
  See application file for complete search history.

(56) References Cited

U.S. PATENT DOCUMENTS

| | | | |
|---|---|---|---|
| 4,777,544 A * | 10/1988 | Brown et al. | 360/75 |
| 6,384,994 B1 * | 5/2002 | Smith et al. | 360/25 |
| 6,384,995 B1 * | 5/2002 | Smith | 360/31 |
| 2004/0032681 A1 * | 2/2004 | Smith et al. | 360/31 |

* cited by examiner

*Primary Examiner*—David Hudspeth
*Assistant Examiner*—Daniell L. Negrón
(74) *Attorney, Agent, or Firm*—Martine Penilla & Gencarella LLP

(57) ABSTRACT

In a method based on readback signal for in-situ measuring of absolute head-medium spacing, a pre-encoded pattern in the magnetic medium on a disk has at least two harmonics with amplitudes such that a linear function of the logarithmic ratio of the spacing loss-term is formed in relation to testing frequencies. This linear function is applied to determine the absolute head-medium spacing directly through the multiplication of gradient of the linear function and the linear velocity between the head and the medium of the disk drive.

25 Claims, 7 Drawing Sheets

METHOD AND IMPLEMENTATION OF IN-SITU ABSOLUTE HEAD MEDIUM SPACING MEASUREMENT

TECHNICAL FIELD

This invention relates to the flying height of a head in a disk drive. More particularly, it relates to a method of measuring the absolute spacing between the medium and the head directly in-situ from the readback signal and the implementation of the method through an apparatus for performing the method disclosed herein.

BACKGROUND OF THE INVENTION

In magnetic data storage devices, data information is stored and retrieved through the use of a magnetic transducer or head performing read and write operations on a magnetic medium. The transducer is also commonly referred to as a head. The magnetic head is deposited on a slider and positioned close to the surface of a disk where the magnetic materials are disposed forming the magnetic disk medium. The gap between the magnetic head and the surface of the magnetic disk medium is known as head-medium separation or magnetic separation. When the magnetic disk spins about the spindle on which it is mounted, the magnetic head on the slider 'flies' above the surface of the magnetic disk. The slider is able to 'fly' as the air between the slider and the disk surface supports the slider. The spacing between the air bearing surface of slider at the trailing edge and the surface of magnetic disk is defined as the flying height or the physical spacing. The increase in demand for higher data storage capacity has lead to an increase in data track density and data linear density on a magnetic (disk) medium. To achieve higher linear density, and to compensate readback signal loss in magnetic separation, a head is required to fly progressively closer to the disk to maintain signal strength. The physical spacing is currently around 10 nm. With the annual growth rate of areal density at 60–120%, there is a need for the physical spacing to be reduced to less than 10 nm. For example, at an areal density of 200 Gb/in$^2$, a stable physical spacing of 5 nm–7 nm would be required. If the areal density is increased further, the head-medium separation will need to be reduced further to ensure adequate signal strength between the magnetic heads and the data track. While the physical spacing is reduced, the magnetic head should not contact the disk surface as this would degrade the performance of head disk interface and may even damage the data recorded in the magnetic disk medium. Therefore, the stability of the head disk interface needs to be constantly monitored and maintained to ensure that the transducer is sufficiently close to the surface of the disk medium for adequate signal strength without risk of the head "crashing" onto the disk medium.

A conventional method for determining the flying height is the optical testing method which is based on optical interference principles for determining the slider-disk interface. The use of a special transparent glass disk in this method for testing the flying height does not reflect the actual situation of the real head disk interface (HDI) with the lubricant and the topographic features. Another limitation is the limit in optical wavelength with a resolution at around 0.25 nm, which is insufficient to accurately provide the physical spacing measurement in the sub-10 nm range. This method measures the physical spacing at head gimble assembly (HGA) level but not during head stack assembly (HSA) level or during drive level manufacturing. Hence this method cannot facilitate quality control during the manufacturing process of disk drives. Therefore alternative methods were developed so as to enable head-medium spacing measurement during the manufacturing process.

Alternative methods are based on the Wallace equation where data information encoded on the magnetic medium is retrieved as readback signals, which is used to measure the head-medium spacing. In these prior art methods, the spacing to be measured is suitable for estimating the relative change in head-medium spacing but not the absolute head-medium spacing.

U.S. Pat. No. 4,777,544 demonstrates a typical harmonic method where the measurement of the flying height is based on relative spacing changes. The amplitude of the readback signal is detected at different frequencies and a ratio of two of such amplitudes is computed which forms mainly as a function of the head-medium spacing. While interfering factors like the effect of the track width and the remnant-moment-thickness (MrT) are eliminated by taking the ratio of the amplitudes to obtain a more accurate measure of the head-medium spacing. The absolute head medium spacing is measured by having the head contact the disk surface, which may cause damage to the giant magnetoresistive (GMR) head.

Therefore, it is desired to have a method that would address the absolute head medium spacing measurement without the contact of the head and medium during the measurement.

SUMMARY OF THE INVENTION

The present invention provides a method that measures the absolute head-medium spacing when the head is at its normal flying status. The method includes encoding a code pattern on the magnetic medium; detecting a readback signal from the medium through the head, where any two harmonic signals can be isolated to extract amplitudes of the two harmonics; applying a series of computation to obtain a logarithmic ratio of the spacing loss-term of the harmonic signals to form a linear relationship with a testing frequency; and applying the linear relationship to compute the absolute head-medium spacing. The logarithmic ratio of the two harmonic amplitudes has a linear portion and a nonlinear portion, which is made up of a spacing loss-term, a gap loss-term and a thickness loss-term. The nonlinear portion is generated by nonlinear components of a gap loss-term and a thickness loss-term. The series of computation includes eliminating the nonlinear portion of the logarithmic ratio of the two harmonics and the linear components of the logarithmic ratio of the gap loss-term and the thickness loss-term such that only the spacing loss-term remains. The nonlinear portion of the logarithmic ratio of the harmonic amplitudes is eliminated through removal of the change in gradient of the logarithmic ratio of the harmonic amplitudes between consecutive test frequencies occurring over a test frequency range. To obtain the linear relationship of spacing loss-term versus testing frequency, the linear components of the logarithmic ratio of the gap loss-term and the thickness loss-term in relation to testing frequency are eliminated by applying known designed value of gap length of read head and thickness of media in a differentiated relationship between the logarithmic ratio of the harmonic amplitudes and test frequency. The linear component is eliminated at low frequency values to minimize error in the projected gap length of read head and the projected thickness of magnetic medium when compared to the actual gap length and medium thickness. At zero frequency, the gradients of the logarithmic ratios of the gap loss-term and the thickness loss-term are a constant. Therefore, when test frequencies are close to zero, the error of projected values of the gap length and thickness of the medium is negligible. From the spacing loss-term a linear relationship with the test frequency is established and through the gradient of the linear relationship, the absolute head medium spacing is deduced.

In one embodiment, the linear relationship between the logarithmic ratio of spacing loss-term and the testing frequency includes a gradient and a constant. The absolute head-medium spacing, which is independent of the testing frequency, is calculated by multiplying the gradient with a product of a constant and the linear velocity of the disk drive. Any encoding code pattern which provides readback signals with at least two harmonics with amplitudes is used to estimate the absolute head-medium spacing.

The harmonic amplitudes are taken at different test frequencies such that one of the two harmonic amplitudes is taken from a lower order harmonic signal and another is taken from a higher order harmonic signal. It is also possible to have the lower harmonic amplitude isolated through an ultra narrow band pass filter and the higher harmonic isolated through another ultra narrow band pass filter.

An alternative approach is to estimate the absolute head-medium spacing through numerical testing of the constant in the linear relationship of the logarithmic ratio of the spacing loss-term and the testing frequency.

Another aspect of the invention provides an apparatus for determining head-medium spacing between a head and a magnetic medium in a disk drive. The apparatus includes an encoded pattern written at a particular frequency on the magnetic medium, a detection device for detecting a readback signal of the encoded pattern, a filter to isolate harmonic signals in the readback signals, a computation unit to compute a logarithmic ratio of the isolated harmonic signals by using the amplitudes of the harmonics and a signal processor for recording the test values. The detecting of readback signals, isolating of harmonics in readback signals, computing of logarithmic ratio of the harmonics amplitudes at different frequency is repeated and the computed values are stored in a register in the signal processor in which a series of computations to eliminate both the nonlinear portion of the logarithmic ratio of the harmonic amplitudes and the linear components of logarithmic ratio of a gap loss-term and linear components of the logarithmic ratio of a thickness loss-term to obtain the logarithmic ratio of the spacing loss-term. A linear relationship between the logarithmic ratio of spacing loss-term and a testing frequency is established, from which a gradient value of the linear relationship is computed and applied in the calculation of the head-medium spacing.

The pre-encoded pattern provides readback signals with harmonics having amplitudes of any magnitude while the magnitude of the readback signal of the two harmonics are relatively close to each other and have high signal intensity such that a higher signal to noise ratio (SNR) is achieved. The detection device comprises of a read head which retrieves data information stored on the magnetic medium and the read head is connected to the filter by a circuit.

In one embodiment, the filter comprises an isolation unit for detecting the amplitude of any two harmonic signals at different frequencies while the computation unit computes the logarithmic ratio of amplitudes two harmonic signals by applying natural log on the ratio of the amplitudes. The two harmonic signals occur at different test frequencies such that one of the two is of a higher order. The signal processor is a digital signal processor (DSP) which includes an analog-to-digital unit, a temporary register for storing computed logarithmic ratio with the testing frequency, and a computation unit to eliminate the gap loss-term and thickness loss-term in order to find out the linear relationship of the spacing loss-term versus testing frequency.

The detecting unit for readback signals, filter for harmonics signals to isolate amplitudes of the harmonics, the computation unit for computing logarithmic ratio and the digital signal processor continuously performs the detecting, filtering, isolating and computing operations to obtain a plurality of logarithmic ratios for establishing of the linear relationship of the logarithmic ratio of the spacing loss-term and the testing frequency.

BRIEF DESCRIPTION OF THE DRAWINGS

The details of the present invention will become apparent by reference to the following description and accompanying drawings wherein.

DETAILED DESCRIPTION OF PREFERRED EMBODIMENT OF THE INVENTION

The present invention is discussed with the accompanying drawings for illustrative purposes and is not in anyway restrictive of the scope and principles of the invention.

Figure 1:
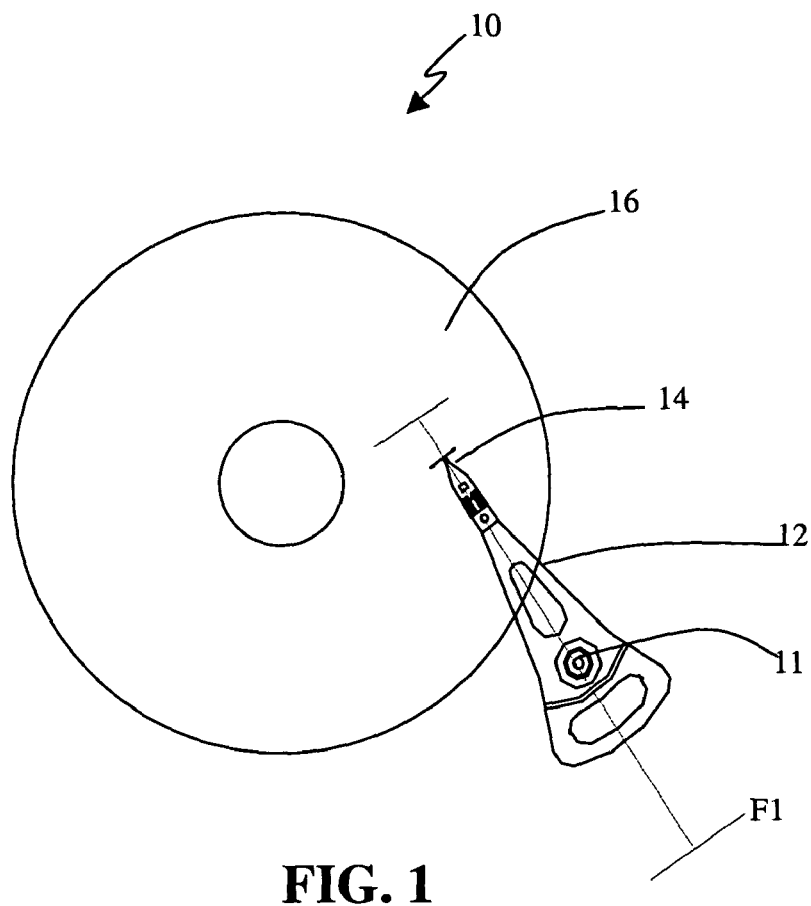
FIG. 1 is a plan view of an actuator with a transducer head in relation to a disk in a disk drive.
Figure 2:
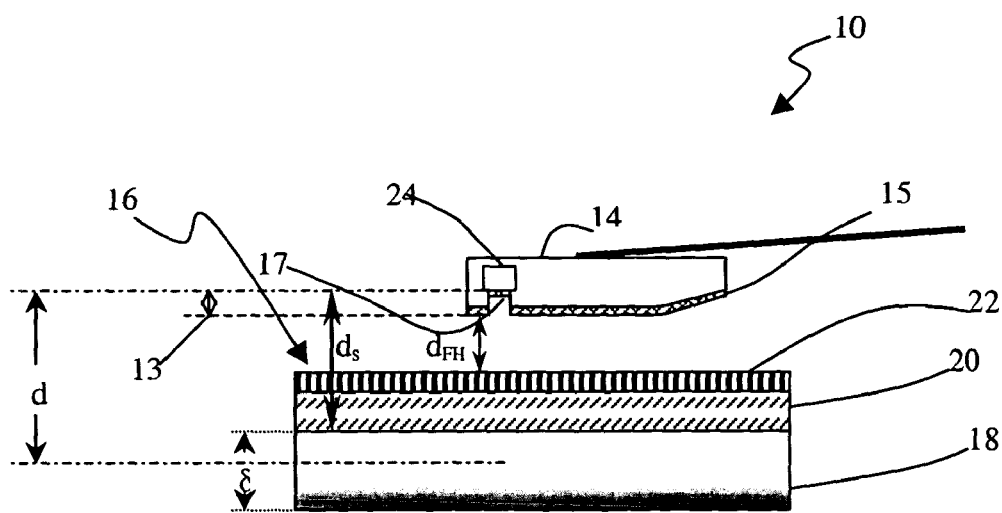
FIG. 2 is a cross-sectional view of the disk drive taken along the line of F1—F1 in FIG. 1.

FIG. 1 shows a disk drive 10 where an actuator 12 with a voice coil motor (VCM) 11 is used to control the movement of the actuator 12 across the disk surface 16. A 'slider' 14 is mounted at the end of the actuator 12 to "fly" above the disk surface when the disk is set to spin. Read/write transducers 24 (see FIG. 2), which are also known as read/write heads, are positioned at the 'slider' with a carefully designed air bearing that is self-pressurized by the airflow of the rapidly spinning disk. This air bearing provides a physical spacing between the magnetic sensors of the read/write head and the disk such that the head does not contact the disk surface 16. The distance between the trailing edge of air bearing surface of the slider 14 and the surface of the disk 16 at the head-disk interface (HDI) is also commonly referred to as the flying height, $d_{FH}$. This flying height does not take into account the protective overcoat 20 and the lubricant 22 on the disk 16, and the protective overcoat 15 and pole tip recess 13 on slider 14 between the head and the disk surface. However, the absolute head-medium spacing is given by:

$$d = d_s + \frac{\delta}{2},$$

where $d_s$ is the head-medium-separation covering the distance from the pole surface 17 of the head and the top surface of the magnetic medium and $\delta$ is the thickness of the magnetic medium 18 as shown in FIG. 2. The head-medium separation includes the flying height $d_{FH}$, the pole tip recess 13, the thickness of the overcoat 20 and the lubricant 22. Therefore, the absolute head-medium spacing, d, includes half of magnetic medium 18, the thickness of the protective overcoat 20 and the lubricant 22 on the disk surface 16, the flying height $d_{FH}$, and the protective overcoat 15 and pole tip recess 13 on slider 14.

Figure 3:
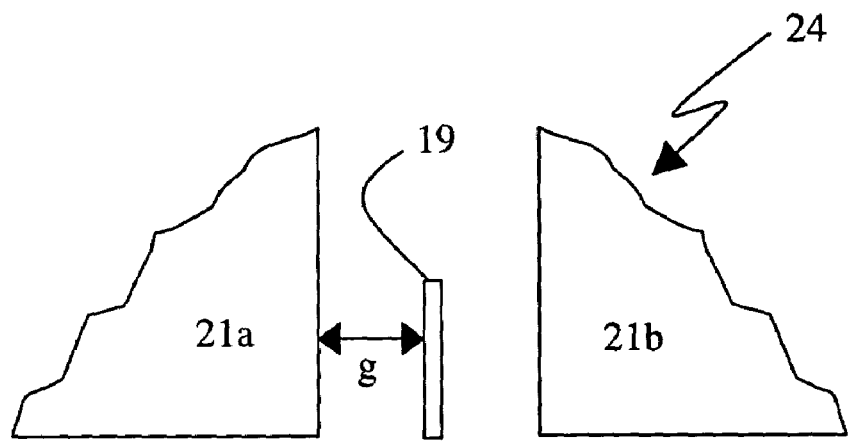
FIG. 3 is a cross-sectional view of GMR read head from FIG. 2 where the sensor and two shields in illustrating the gap length are shown.

FIG. 3 shows an exploded cross-sectional view of the head 24 which includes a giant magnetoresistive (GMR) sensor 19 sandwiched by a shield 21. The cross-sectional view shows the shield in two portions 21a and 21b. Between the surface of the GMR sensor and the shield is a gap "g", which is a factor that contributes to the amplitude of a readback signal from the medium used for estimating the head-medium spacing.

The present invention provides an in-situ method for measuring the absolute head-medium spacing, d, between the pole surface 17 of the head 24 and the middle of the magnetic medium 18 on the disk surface through a series of computation based on the amplitude of at least two harmonics detected in readback signals of any code pattern encoded on the disk surface.

The amplitude of a readback signal from GMR sensor in spatial frequency domain is expressed as:

$$V(k) = Ae^{-kd}\frac{1-e^{-k\delta}}{k\delta}\frac{\sin(kg/2)}{kg/2} \quad (1)$$

where, A represents all the amplitude contribution terms which are non-frequency related;

$k=2\pi/\lambda$ is wave number, $\lambda$ being the wavelength of recorded signal;

d is magnetic spacing between head and medium;

$\delta$ is the thickness of magnetic medium; and g is the gap length of GMR read head.

In addition to non-frequency related amplitude contribution terms represented by A, the amplitude of the readback signal includes three loss-terms being:

the spacing loss-term defined as:

$$L_d = e^{-kd} \quad (2)$$

the thickness loss-term defined as:

$$L_\delta = \frac{1-e^{-k\delta}}{k\delta} \quad (3)$$

and the gap loss-term defined as:

$$L_g = \frac{\sin(kg/2)}{kg/2} \quad (4)$$

which are frequency related. By substituting Equations (2), (3) and (4) into Equation (1), the amplitude of a readback signal from the GMR sensor in spatial frequency domain can be rewritten as:

$$V(k) = AL_d L_\delta L_g \quad (5)$$

It can be seen from Equation (2), (3), (4) and (5) that the amplitude of the readback signal decreases with increase in frequency. Therefore, the amplitude of the readback signal is also frequency related.

In magnetic recording systems, code patterns are pre-encoded in the disk surface for generating readback signals for different purposes, one of the purposes is to detect harmonics in the readback signals for estimating the physical spacing. In the present invention, at least two harmonics with amplitudes are selected for the purpose of estimating the head-medium spacing. The selection of the two harmonics from the readback signals of any given code pattern is determined according to the characteristic of the code pattern encoded in the disk. For example, for a particular code pattern, X, the $m^{th}$ and $n^{th}$ harmonics, where the $n^{th}$ harmonic is of a higher order than the $m^{th}$ harmonic, are selected in view that the respective amplitudes, $V_n$ and $V_m$, of the two harmonics are most comparable.

From Equation (5), the ratio of the amplitudes of the two selected harmonics can be expressed as:

$$\frac{V_n}{V_m} = A_{nm}\frac{L_{dn}}{L_{dm}}\frac{L_{\delta n}}{L_{\delta m}}\frac{L_{gn}}{L_{gm}} \quad (6)$$

and re-expressed, with substitution of Equation (2), (3) and (4) as:

$$\frac{V_n}{V_m} = A_{nm}\left(e^{\frac{2\pi(n-m)d}{\lambda}}\right)\left(\frac{m}{n}\frac{1-e^{-2n\pi\delta/\lambda}}{1-e^{-2m\pi\delta/\lambda}}\right)\left[\frac{m}{n}\frac{\sin(n\pi g/\lambda)}{\sin(m\pi g/\lambda)}\right] \quad (7)$$

$$= A_{nm}\left(e^{\frac{2\pi(n-m)fd}{v}}\right)\left(\frac{m}{n}\frac{1-e^{-2n\pi f\delta/v}}{1-e^{-2m\pi f\delta/v}}\right)\left[\frac{m}{n}\frac{\sin(n\pi fg/v)}{\sin(m\pi fg/v)}\right]$$

where, $$A_{nm} = \frac{A_n}{A_m}$$

is the ratio of the amplitude related terms of the two harmonic signals which is non-frequency related, λ is the wavelength of the first harmonic signal,
v is the velocity between the head and the medium, and
f is the frequency of the first harmonic signal.

From Equation (6), the logarithmic ratio of the amplitude of the two harmonics is given as:—

$$-\left[\ln\left(\frac{V_n}{V_m}\right)\right] = -\left[\ln\left(\frac{L_{dn}}{L_{dm}}\frac{L_{\delta n}}{L_{\delta m}}\frac{L_{gn}}{L_{gm}}\right)\right] - \ln(A_{nm}) \quad (8)$$

Figure 4:
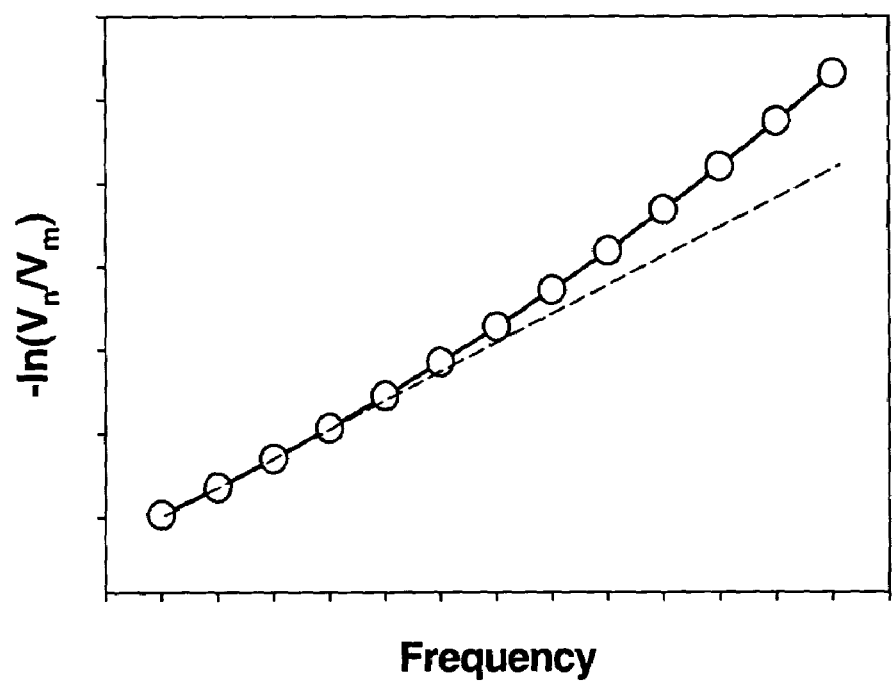
FIG. 4 is a graph of the natural logarithm of the ratio of two selected harmonic amplitudes in relation of frequency.

FIG. 4 shows that the relation of the logarithmic ratio with test frequency is not of a linear nature. From Equation (6), the logarithmic ratio of the amplitudes of the harmonics can be expressed in terms of the three loss-term components as:

$$-\left[\ln\left(\frac{V_n}{V_m}\right)\right] = \left[-\ln\left(\frac{L_{dn}}{L_{dm}}\right)\right] + \left[-\ln\left(\frac{L_{\delta n}}{L_{\delta m}}\right)\right] + \left[-\ln\left(\frac{L_{gn}}{L_{gm}}\right)\right] + [-\ln(A_{nm})] \quad (9)$$

Figure 5:
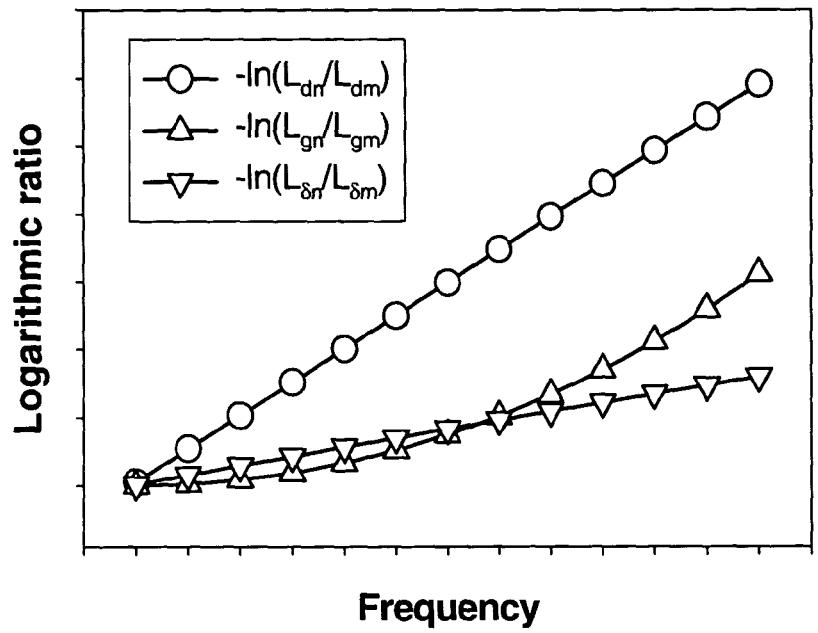
FIG. 5 is a graph of the natural logarithmic ratio of the spacing loss-term, thickness loss-term and gap loss-term of two harmonic signals in relation to frequency.
Figure 6:
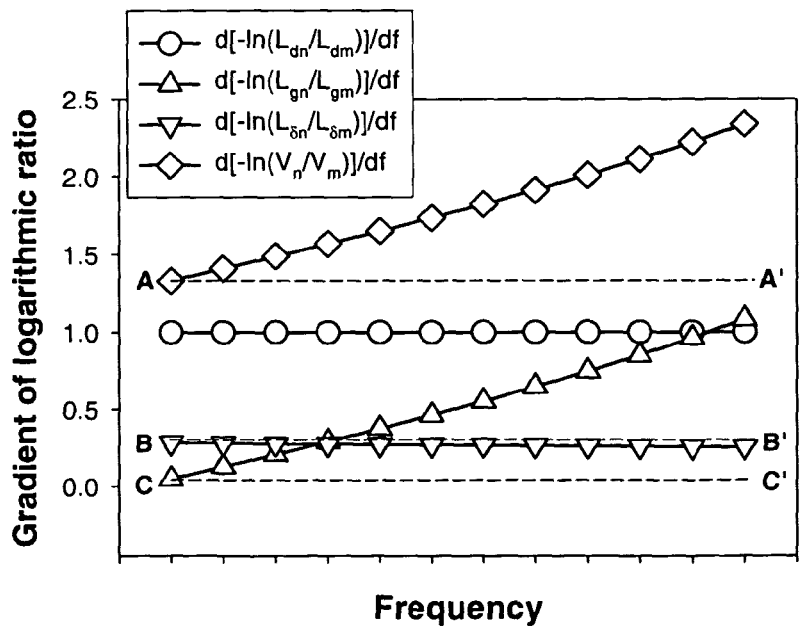
FIG. 6 is a graph of the gradient of the natural logarithmic ratios of the spacing loss-term, thickness loss-term and gap loss-term of two selected harmonic signals in relation to frequency.

In FIG. 5 is shown the logarithmic ratios of each of the three loss-term components: spacing loss-term $L_d$, thickness loss-term, $L_\delta$ and gap loss-term, $L_g$ in relation to testing frequency. Among these three logarithmic ratios of the loss-term components, only the logarithmic ratio of spacing loss, $$\left[-\ln\left(\frac{L_{dn}}{L_{dm}}\right)\right],$$

is strictly linear. This is further illustrated in FIG. 6 where a plot of the gradient of the logarithmic ratio in relation to the test frequency provides a horizontal line, showing that the gradient is constant for the logarithmic ratio of spacing loss-term while the logarithmic ratio of thickness loss-term, $$\left[-\ln\left(\frac{L_{\delta n}}{L_{\delta m}}\right)\right],$$

and gap loss-term, $$\left[-\ln\left(\frac{L_{gn}}{L_{gm}}\right)\right],$$

are not constant. The plots of these two loss-terms are nonlinear and do not fall on the respective horizontal lines BB' and CC', indicating that the gradient of the logarithmic ratios of the gap loss-term and thickness loss-term changes with frequency. It is also shown in FIG. 6 that the plot of the gradient of $$\left[-\ln\left(\frac{V_n}{V_m}\right)\right]$$

with respect to test frequency does not fall along the horizontal line AA' clearly showing that the gradient is not constant and changes with frequency. This indicates that the logarithmic ratio of the amplitudes of the harmonics consist of the non-linear components of the gap loss-term and thickness loss-term.

In view that the logarithmic ratio of the amplitude of the harmonics, $$\left[-\ln\left(\frac{V_n}{V_m}\right)\right],$$

is the sum of the logarithmic ratio of three component loss-terms according to Equation (9), to estimate the head-medium spacing, d, the spacing related term $$\left[-\ln\left(\frac{L_{dn}}{L_{dm}}\right)\right]$$

needs to be separated from test data, $$\left[-\ln\left(\frac{V_n}{V_m}\right)\right].$$

To do so, the nonlinear components of $$\left[-\ln\left(\frac{L_{\delta n}}{L_{\delta m}}\right)\right] \text{ and } \left[-\ln\left(\frac{L_{gn}}{L_{gm}}\right)\right]$$

in the test data are eliminated through the use of the following equations (10) and (11):

$$\Delta dV_{nm}(i) = \Delta \ln\left[\frac{V_n(f_{i+1})}{V_m(f_{i+1})}\right] - \Delta \ln\left[\frac{V_n(f_i)}{V_m(f_i)}\right] \quad (10)$$

$$= \left\{\ln\left[\frac{V_n(f_{i+2})}{V_m(f_{i+2})}\right] - \ln\left[\frac{V_n(f_{i+1})}{V_m(f_{i+1})}\right]\right\} -$$

$$\left\{\ln\left[\frac{V_n(f_{i+1})}{V_m(f_{i+1})}\right] - \ln\left[\frac{V_n(f_i)}{V_m(f_i)}\right]\right\}$$

Figure 7:
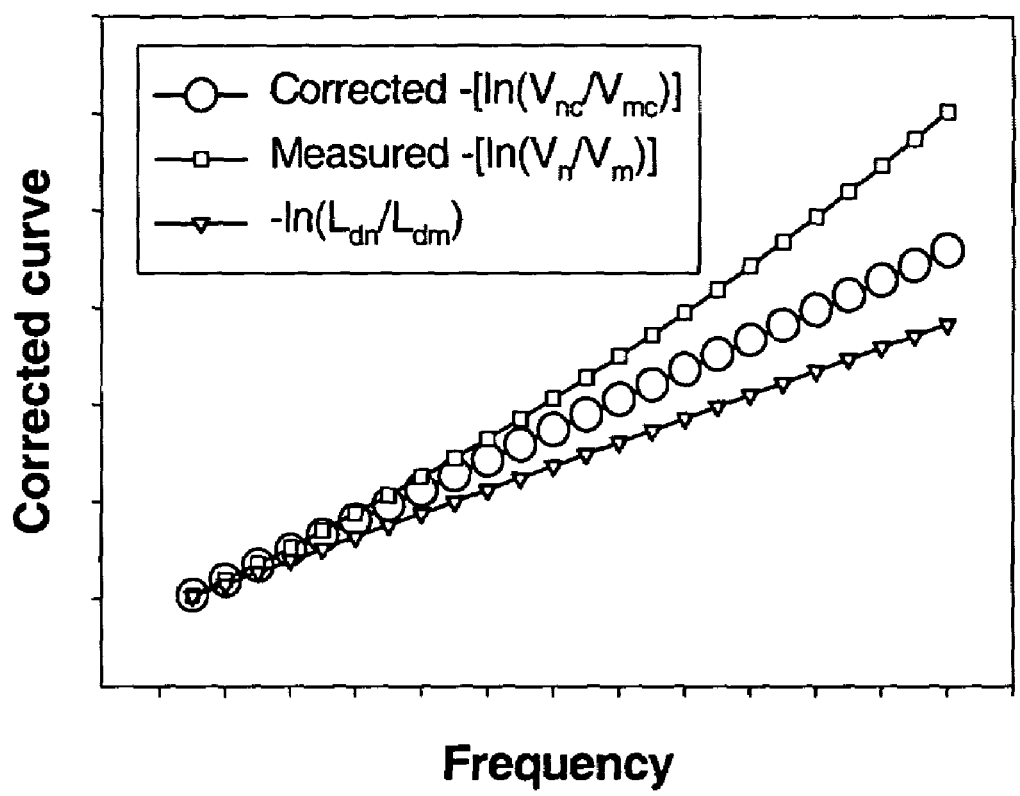
FIG. 7 is a graph of the natural logarithmic ratio of the harmonics of the readback signals as measured, corrected natural logarithmic ratio of the harmonics of the readback signals and the natural logarithmic ratio of the spacing loss-term in relation to frequency.

Equation (10) gives the change in gradient of the logarithmic ratio of the harmonic amplitudes that occur between consecutive test frequencies. The summation of change in gradient of the logarithmic ratio occurring at each test frequency up to the $i^{th}$ test frequency is subtracted from the measured logarithmic ratio occurring at the $i^{th}$ test frequency to give the corrected logarithmic ratio:

$$\ln\left[\frac{V_{nc}(f_i)}{V_{mc}(f_i)}\right] = \ln\left[\frac{V_n(f_i)}{V_m(f_i)}\right] - \sum_{j=1}^{i} \Delta dV_{nm}(i) \quad (11)$$

where, i is an integer such that $f_i$ is the $i^{th}$ frequency of the testing frequency series and the testing frequency takes an increment step $\Delta f$ of constant magnitude. By eliminating the summation of the change in gradient of the logarithmic ratio of the harmonic amplitudes between consecutive test frequencies over a test frequency range of j=1 to i, $$\sum_{j=1}^{i} \Delta dV_{nm}(i),$$

the tested logarithmic ratio $$\left[-\ln\left(\frac{V_n}{V_m}\right)\right]$$

of the harmonic amplitudes becomes linear $$\left[-\ln\left(\frac{V_{nc}}{V_{mc}}\right)\right]$$

as shown in FIG. 7 with the elimination of the non-linear portion of the tested logarithmic ratio of the harmonic amplitudes which is contributed from the non-linear components of the thickness loss-term and the gap loss-term. The gradient of the corrected logarithmic ratio of the harmonic amplitudes, $$\left[-\ln\left(\frac{V_{nc}}{V_{mc}}\right)\right] \sim f$$

takes the value at the level AA' in FIG. 6.

As the gap loss-term and thickness loss-term includes both linear and non-linear components, the linear components in these two loss-terms also need to be eliminated from the test data to obtain only the spacing loss-term. The linear components of the gap loss-term and thickness loss-term are eliminated through eliminating the gradient of the components of the gap and thickness loss-terms in Equation (9). This will in turn provide the gradient of the spacing loss-term. To determine the gradient of spacing loss-term, Equation (9) is differentiated giving the expression:

$$\frac{d[-\ln(L_{dn}/L_{dm})]}{df} = \frac{d[-\ln(V_{nc}/V_{mc})]}{df} - \frac{d[-\ln(L_{gn}/L_{gm})]}{df}\bigg|_{f=f_1} - \frac{d[-\ln(L_{\delta n}/L_{\delta m})]}{df}\bigg|_{f=f_1}$$ (12)

where, $f_1$ is the lowest of the testing frequency series, $$\frac{d[-\ln(L_{\delta n}/L_{\delta m})]}{df}\bigg|_{f=f_1}$$

takes the projected value at BB', which represents the gradient of the plot of the logarithmic ratio of the thickness loss-term with respect to frequency, in FIG. 6, and $$\frac{d[-\ln(L_{gn}/L_{gm})]}{df}\bigg|_{f=f_1}$$

takes the projected value at CC', which represents the gradient of the logarithmic ratio of the gap loss-term with respect to frequency, in FIG. 6. The projected values of BB' and CC' are calculated through known acceptable tolerance design values of the medium thickness and gap length by the use of Equation (7).

From FIG. 6, the projected value of AA' represents the gradient of the tested logarithmic ratio of the two harmonic signals. In accordance with Equation (12), the gradient of the spacing loss-term can also be written as:

$$\frac{d[-\ln(L_{dn}/L_{dm})]}{df} = AA' - BB' - CC'$$ (12')

In order to determine an accurate gradient of the logarithmic ratio of the spacing loss-term, $$\frac{d[-\ln(L_{dn}/L_{dm})]}{df},$$

the value of $f_1$ is critical. Ideally, the tolerance of the gap length of each individual head should not contribute any error to the head-medium spacing measurement because the gradient of the logarithmic ratio of the spacing loss-term should be zero at $$f = 0 \left(\frac{d[\ln(L_{gn}/L_{gm})]}{df}\bigg|_{f=0} = 0\right).$$

However, this is not possible as having f=0 would mean that no signal is generated which means readback is not performed and that the read head is not 'flying' above the magnetic disk surface. If $f_1$ is non-zero, the gap length of the read head g and the medium thickness δ are required to calculate the initial gradient values of logarithmic ratio of gap loss-term (BB') and thickness loss-term (CC'). When $f_1$ is small enough, the values of gap loss and thickness loss are very close to that at $f_1$=0. The designed values of gap length and medium thickness can be applied to calculate the gradient of logarithmic ratios of gap loss (BB') and thickness loss (CC'). The tolerances of the gap length of the individual head and the thickness of the individual medium are treated as testing errors. These errors are small and acceptable if f=$f_1 \neq 0$ but is a small non-zero frequency value.

It is observed in FIG. 4 that the measured $$\left[-\ln\left(\frac{V_n}{V_m}\right)\right]$$

exhibit good linearity at low frequency. This quasi-linear relationship between the logarithmic ratio and frequency at low frequency values can be used to verify the tested value of $$\left[-\ln\left(\frac{V_n}{V_m}\right)\right]$$

at $f_1$ in order to get an accurate head-medium spacing measurement. With the use of the calculated value of $$\frac{d[-\ln(L_{dn}/L_{dm})]}{df}$$

in Equation (12'), the value of $$\left[-\ln\left(\frac{L_{dn}}{L_{dm}}\right)\right]$$

can be deduced through the relationship:

$$-\left[\ln\left(\frac{L_{dn}}{L_{dm}}\right)+c\right] = \frac{d[-\ln(L_{dn}/L_{dm})]}{df}\Delta f \quad (12'')$$

where $\Delta f$ is the incremental step in frequency.

Figure 8:
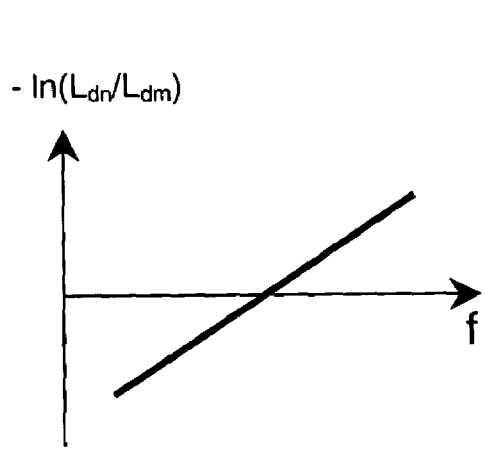
FIG. 8 is a graph of the natural logarithm of the ratio of two spacing loss-terms $L_n$ and $L_m$ in relation to frequency.
Figure 9:
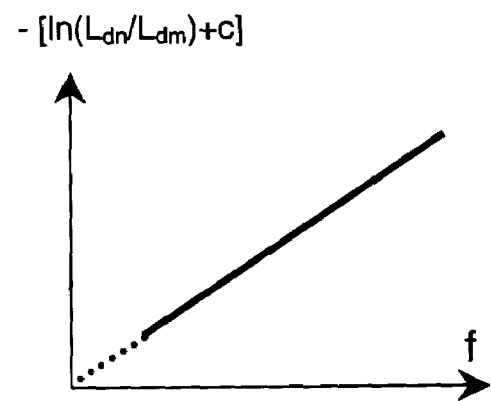
FIG. 9 is a graph of the natural logarithm of the ratio of two spacing loss-terms $L_n$ and $L_m$ with a constant in relation to frequency.
Figure 10:
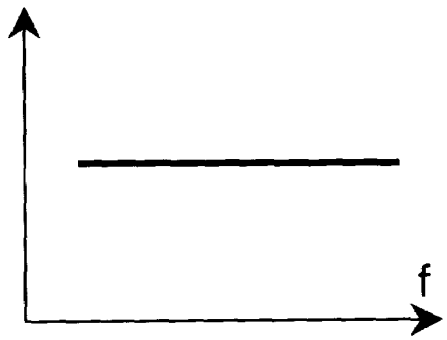
FIG. 10 is a graph of the head media spacing in relation to frequency.

From Equation (7) and taking the natural logarithm of the equation, the absolute head-medium spacing, d, can be expressed as:

$$d = -\frac{\lambda}{2\pi(n-m)}\left[\ln\left(\frac{L_{nd}}{L_{md}}\right)+c\right] \quad (13)$$

where $L_{md}$ is the amplitude of the lower order harmonic of the spacing loss-term generated, $L_{nd}$ is the amplitude of the higher order harmonic of the spacing loss-term generated, $\lambda$ is the wavelength of the fundamental harmonic signal and $c=\ln(A_{nm})$ is a constant related to all the signal amplitude contribution terms which are not related to the testing frequency. By the principle of the logarithm calculation, the relationship of $$-\ln\left(\frac{L_{nd}}{L_{md}}\right)$$

with frequency, f, is a straight line as shown in FIG. 8. This linear relationship can be expressed as:

$$-\ln\left(\frac{L_{nd}}{L_{md}}\right) = af + c \quad (14)$$

where a is the gradient of the straight line and c is the constant. This characteristic can be re-expressed as:

$$-\left[\ln\left(\frac{L_{nd}}{L_{md}}\right)+c\right] = af \quad (15)$$

which is depicted in FIG. 9. By substituting Equation (15) in Equation (13), the absolute head-medium spacing can be expressed in terms of frequency, f as:

$$d = a\frac{\lambda f}{2\pi(n-m)} \quad (16)$$

and the relationship between d and f is illustrated in FIG. 10. Since $f\lambda=v$, the linear velocity between the head and the medium, the absolute head-medium spacing, d can be expressed as:

$$d = \frac{av}{2\pi(n-m)} \quad (17)$$

While prior art methods rely on Equation (13) to obtain the absolute head-medium spacing indirectly through estimating the constant, c, the present invention provides a direct calculation method without the need to estimate the constant. With a known linear velocity, v, d can be calculated using Equation (17). This increases the accuracy of the calculated absolute head-medium spacing, d. It is also not necessary for the head to contact the disk surface in finding the reference point for determining the physical spacing as disclosed in U.S. Pat. No. 4,777,544, which may cause damage to the giant magnetoresistive (GMR) head.

Figure 11:
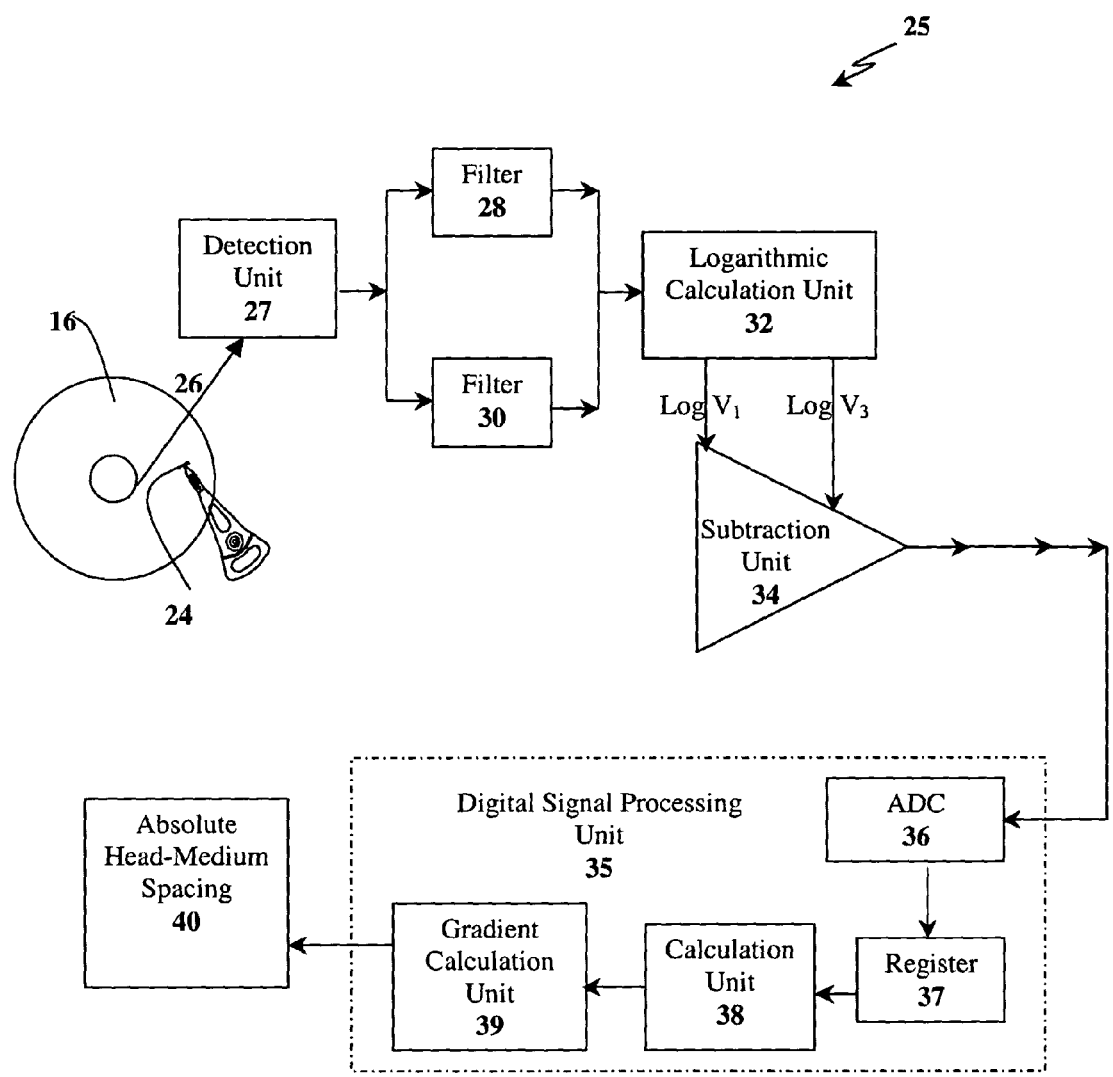
FIG. 11 is an algorithm of the method in the present invention applied in an apparatus.

FIG. 11 shows the method of the present invention implemented in a circuit 25. A pre-encoded pattern is written on the magnetic layer 18 (see FIG. 2) of the disk medium 16, which is retrieved as a readback signal 26. This readback signal 26 is detected by a detection unit 27 which then passes the readback signal 26 through two filters 28 and 30 where the two harmonics in the readback signal are isolated and the amplitude of these harmonic signals extracted for obtaining the natural log of the amplitudes, which is tabulated in a logarithmic calculation unit 32. The difference in the natural log of the amplitudes of the two harmonics is computed in a subtraction unit 34, which is also an amplifier, to realize the log of the amplitude ratio of the amplitudes of the two harmonics. The ratio is passed to a digital signal processor (DSP) 35. The DSP 35 includes an analog-to-digital (ADC) unit 36 where the amplified logarithmic ratio is converted from analog to digital and stored in a register 37. The detection of the readback signal in detection unit 27, isolation of two harmonics in the readback signal in the filters 28 and 30, and the calculation of the logarithmic ratio of two harmonic amplitudes in the logarithmic calculation unit 32 and in the subtraction unit 34 are repeated at different testing frequencies and the results of these calculations are stored in register 37. The different testing frequencies correspond to the occurrence of the fundamental harmonic of the readback signal. The linear and nonlinear components of the logarithmic ratio of the gap loss-term and thickness loss-term are eliminated from the logarithmic of ratio of harmonic amplitudes in a calculation unit 38 in the DSP. Only the logarithmic ratio of the spacing loss-term calculated at these different testing frequencies is retained to establish a linear relationship in a plot of the logarithmic ratio of the spacing loss-term against the corresponding testing frequencies. The gradient, which defines the linear relationship, is calculated in a gradient calculation unit 39 from the plot as shown in FIG. 8. This gradient is then applied in Equation (17) to obtain the absolute head-medium spacing 40.

EXAMPLE

The following is an example to illustrate the present invention. A code pattern (111100) is pre-encoded on a magnetic disk surface. The preferred lower order harmonic and higher order harmonic are the first and third order harmonics, respectively, for this code pattern (i.e. n=3 and m=1). According to FIG. 11, this code is detected as a readback signal through the read head, which is then passed through filters for isolating the first and third harmonics. The ratio of the isolated harmonic amplitudes is calculated after the natural logarithms of the harmonic signals are tabulated in an algorithm in a digital signal processor (DSP) and the frequencies at which of these harmonics occur are registered. The gap loss-term and the thickness loss-term are removed by applying Equations (10) to (12) to establish the linear relationship of the logarithmic ratio of the spacing loss-term versus testing frequency and determining the gradient of the linear relationship to obtain the value of a. The absolute head-medium spacing, d, is obtained by applying the gradient, a, in Equation (17), where the velocity, v, of the disk drive is known.

Figure 12:
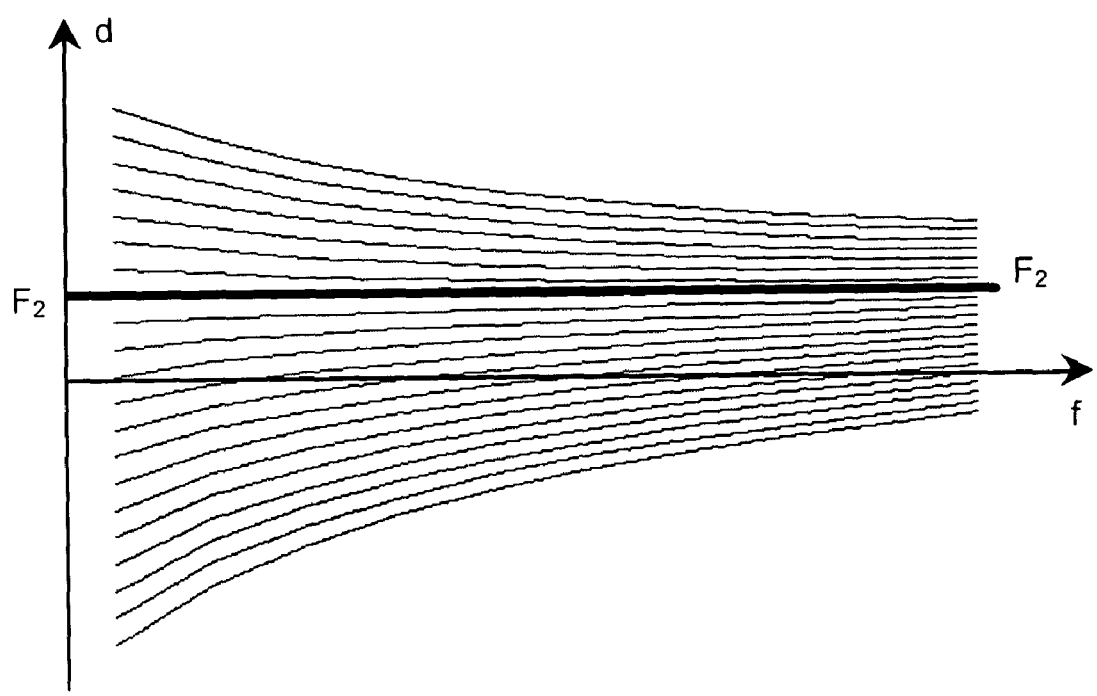
FIG. 12 is a graph of applying different "c" value to generate different "d" value in relation to frequency, f.

Another characteristic of the present invention is that the head-medium spacing, d, is independent of frequency, f, as can be seen in Equation (17). This characteristic is supported by FIG. 10 where the value of d is constant with respect to the testing frequency values, f, corresponding to the occurrence of the fundamental harmonic in any two harmonic signals for which the amplitudes are used to obtain a logarithmic ratio. By applying the numerical method where the constant, c, is varied in Equation (13), different d values are obtained. When these estimated values of d are plotted against the corresponding testing frequency f, it is shown that the estimated values of d changes with f as shown in FIG. 12. Only one particular constant value of c, when applied to Equation (13) gives a value of d, which is independent of the testing frequencies as shown in a horizontal line ($F_2$—$F_2$) in FIG. 12. This constant value, c, gives the absolute head-medium spacing as it conforms with the second characteristic.

This embodiment can be applied by having the DSP in FIG. 11 compute the different values of d using Equation (13) by applying arbitrary values of c where the computed values of d are tested over a testing frequency range to verify if it is a constant value. Where the value of d is constant over the testing frequency range, that d value is the absolute head-medium spacing.

Various other embodiments of the invention provide advantages complementary to those already described without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

We claim:

1. A method for measuring absolute head-medium spacing between a head and a magnetic medium in a disk drive, the method comprising:

encoding a code pattern on the magnetic medium;
obtaining a spacing loss-term from the code pattern;
applying a logarithmic ratio of the spacing loss-term to compute the absolute head-medium spacing;
detecting a readback signal of the code pattern through the head, where the readback signal provides at least two harmonic signals with amplitudes;
isolating the at least two harmonic signals to obtain a logarithmic ratio of the harmonic amplitudes; and
obtaining the logarithmic ratio of the spacing loss-term from the logarithmic ratio of the harmonic amplitudes, which forms a linear relationship with a testing frequency, wherein the detecting of the readback signals, the isolating of the harmonic signals, and the obtaining of the logarithmic ratio of the spacing loss-term is repeated to obtain a plurality of logarithmic ratios of the spacing loss-term occurring at a plurality of test frequencies.

2. The method of claim 1, wherein the logarithmic ratio of the harmonic amplitudes exhibits a quasi-linear relationship with the test frequency at low frequency.

3. The method of claim 1, wherein the obtaining of the logarithmic ratio of the spacing loss-term includes subtracting a logarithmic ratio of a gap loss-term and a logarithmic ratio of a thickness loss-term from the logarithmic ratio of the two harmonic amplitudes.

4. The method of claim 3, wherein each of the logarithmic ratio of the gap loss-term and the logarithmic ratio of the thickness loss-term includes linear and non-linear components.

5. The method of claim 1, wherein the linear relationship between the logarithmic ratio of the spacing loss-term and the testing frequency includes a gradient and a constant.

6. The method of claim 5, wherein the absolute head-medium spacing is calculated by multiplying the gradient with a product of a constant and a linear velocity of the disk drive.

7. The method of claim 1, wherein the at least two harmonic amplitudes are taken at different test frequencies.

8. The method of claim 7, wherein one of the at least two harmonic amplitudes is taken from a lower order harmonic signal.

9. The method of claim 7, wherein one of the at least two harmonic amplitudes is taken from a higher order harmonic signal.

10. The method of claim 1, wherein the absolute head-medium spacing is independent of the testing frequency.

11. The method of claim 5, wherein the constant in the linear relationship of the logarithmic ratio of the spacing loss-term and the testing frequency is estimated through numerical calculation.

12. The method of claim 4, wherein the nonlinear components are eliminated through removal of a sum of change in gradient of logarithmic ratio of the harmonic amplitudes between consecutive test frequencies occurring over a test frequency range to obtain a linear logarithmic ratio of harmonic amplitudes.

13. The method of claim 4, wherein the linear components are eliminated from the logarithmic ratio of the harmonic amplitudes through subtracting calculated gradient values of logarithmic ratio of the gap loss-term and the thickness loss-term.

14. The method of claim 13, wherein the gradient values are calculated by applying known design values of gap length of the head and thickness of the magnetic medium.

15. The method of claim 13, wherein the elimination of the linear components is preferably carried out at a low frequency.

16. The method of claim 12, wherein the linear logarithmic ratio of harmonic amplitudes is verified against the quasi-linear relationship between the logarithmic ratio of the harmonic amplitudes and the test frequency.

17. An apparatus for determining head-medium spacing between a head and a magnetic medium in a disk drive, the apparatus comprising:
a code pattern encoded on the magnetic medium;
a detection device to detect a readback signal of the code pattern;
a filter to isolate harmonic signals from the readback signal;
a logarithmic calculation unit to compute a logarithmic ratio of the isolated harmonic signals; and
a signal processor configured to obtain a logarithmic ratio of a spacing loss-term, to establish a linear relationship of the logarithmic ratio of the spacing loss-term with a testing frequency, and to compute a gradient value of the linear relationship which is applied in the calculation of the head-medium spacing, wherein the logarithmic ratio of the spacing loss-term is obtained by subtracting a logarithmic ratio of a gap loss-term and a logarithmic ratio of a thickness loss-term from the logarithmic ratio of the isolated harmonic signals.

18. The apparatus of claim 17, wherein the detection device comprises a read head which retrieves data information stored on the magnetic medium.

19. The apparatus of claim 17, wherein the filter comprises an isolation unit for detecting amplitudes of any two harmonic signals at different frequencies.

20. The apparatus of claim 19, wherein the logarithmic calculation unit computes the logarithm of amplitudes of the two harmonic signals by applying natural log on the amplitudes.

21. The apparatus of claim 19, wherein the two harmonic signals occur at different test frequencies such that one of the two is of a higher order.

22. The apparatus of claim 17, wherein the signal processor is a digital signal processor (DSP) which includes an analog-to-digital unit.

23. The apparatus of claim 17, wherein the logarithmic ratio of the gap loss-term and the logarithmic ratio of the thickness loss-term include non-linear components and linear components.

24. The apparatus of claim 21, wherein the testing frequency is the frequency where the fundamental harmonic of the readback signal occurs.

25. The apparatus of claim 17, wherein the detection device, the filter, the logarithmic calculation unit, and the signal processor continuously perform detecting, filtering, isolating, and computing to obtain a plurality of logarithmic ratios for establishing the linear relationship of the logarithmic ratio of the spacing loss-term and the testing frequency.

* * * * *